(12) United States Patent
Krasner et al.

(10) Patent No.: US 6,901,643 B1
(45) Date of Patent: Jun. 7, 2005

(54) DRIP SYSTEM TOOL

(76) Inventors: Robert E. Krasner, 6059 Thorne Bay Ct., Las Vegas, NV (US) 89110;
Ronald D. Krasner, 6059 Thorne Bay Ct., Las Vegas, NV (US) 89110

( * ) Notice: Subject to any disclaimer, the term of this patent is extended or adjusted under 35 U.S.C. 154(b) by 0 days.

(21) Appl. No.: 10/603,234

(22) Filed: Jun. 24, 2003

(51) Int. Cl.$^7$ ................................................. B23P 19/04
(52) U.S. Cl. ...................... 29/268; 72/325; 72/409.01; 137/318
(58) Field of Search .............................. 72/325, 409.01; 137/318; 29/268; 269/268, 269, 270; 81/418, 429.5, 426, 426.5, 427.5

(56) References Cited

U.S. PATENT DOCUMENTS 1,882,095 A * 10/1932 Reggittis ...................... 29/268
4,018,110 A * 4/1977 Spriggs ........................ 81/3.08

* cited by examiner

Primary Examiner—Robert C. Watson

(57) ABSTRACT

The drip system tool is similar to a pair of pliers with a piercing member and a retention member crossed in the center and rotatably fastened together. The piercing member has a handle with a gripping surface on one end and an inwardly projecting piercing pin on the opposite end. The retention member has a handle with a gripping surface on one end and an inwardly projecting arcuate retention hook on the opposite end. The retention hook is of a sufficient diameter to retain a piece of irrigation hose for the formation of a hole by the piercing pin. The retention member also features an axially oriented extension formed with a cylindrical socket for holding a conventional connector fitting for a drip irrigation system.

10 Claims, 4 Drawing Sheets

DRIP SYSTEM TOOL

BACKGROUND OF THE INVENTION

1. Field of the Invention

The present invention relates to a handheld tool for use in connection with drip irrigation systems. The drip system tool has particular utility in connection with puncturing a conventional hose used in drip irrigation systems for secure placement of a standard drip irrigation connector within the previously formed hole.

2. Description of the Prior Art

Drip irrigation systems have long proved to be an effective and efficient means for watering landscaping, especially in hot, dry climates. Drip irrigation causes water to trickle or drip at a very low flow rate into a controlled root zone area. This type of irrigation conserves water by placing it under the surface of the soil thereby reducing the rate of evaporation. In addition, drip irrigation reduces plant damage as opposed to conventional sprinkler systems where water is sprayed on the foliage and can cause disease and burning of wet foliage in severe heat and sun situations.

Conventional implementation of a drip irrigation system involves placing a main hose with secondary hoses branching out from it to deliver water to desired areas. The secondary hoses are connected to the main hose with special connector fittings which must be inserted into the hose as the system is put together. Various methods and devices have been used to pierce the main hose, including nails and drills. A leak will develop around the hole if the resulting hole is not the correct size, resulting in possible repair and requiring a new hole to be placed in another location. Therefore a handheld device that could be used to easily puncture the hose and consistently form holes with the correct diameter for connector fittings would be a highly desirable tool for individuals installing drip irrigation systems, saving them both time and effort in the installation process.

The use of piercing tools is known in the prior art. For example, U.S. Pat. No. 4,017,958 to Richard E. Diggs discloses an irrigation apparatus that is similar to a pair of needle-nose pliers having tapered gripping jaws with an inwardly facing piercing element on one jaw and a semicircular hose bracket on the opposing jaw. However, the Diggs '958 patent is limited in usage to hoses that will fit in the hose bracket provided on the pliers. Additionally, the piercing element of the Diggs '958 patent is the drip emitter, or connector, to be inserted into the main hose of the system. This requires the user to continually slide the element onto the pliers and remove the device once it is inserted into the hose, which could be time consuming and awkward for many individuals. Finally, use of the drip emitter as the piercing element of the Diggs '958 device could lead to damage or breakage of the drip emitter, requiring repair or replacement of the part.

U.S. Pat. No. 5,893,201 to Michael R Myers discloses an installation tool for irrigation emitter barbs that is a cross-handled device consisting of a cradle member and a cradle jaw on opposing ends and a barb holder member having a barb holder handle and a barb holder jaw on opposing ends. The cradle is suitable for receiving a peripheral portion of irrigation tubing, and the barb holder is aligned with the cradle so emitter barbs can be directly inserted into the irrigation tubing held in the cradle. However, the Myers '201 patent teaches a square cradle upon which the hose rests and which could lead to slippage of the hose during the piercing process. Additionally, no mechanism is provided by the Myers '201 patent to hold the hose in place dining the piercing process, which could also lead to slippage of the hose and could result in a torn or damaged hose.

Similarly, U.S. Pat. No. 5,301,532 to Carl E. Bickmore and Larry F. Langlais discloses a tube piercing and fluid irrigation device that consists of upper and lower jaws mounted on locking pliers. The upper jaw consists of a mounting plate holding a piercing pin unit, and then lower jaw consists of a rotatable tube cradle component having a number of various sized cradles for receipt of cylindrical tubing of different sizes. However, the Bickmore, et al. '532 patent fails to provide a means for holding the connector to be inserted into the hole in the irrigation hose. Furthermore, the cradle component of the Bickmore, et al. '532 device requires the user to maneuver and reset it each time a different sized hose is used. Finally, the fixed sizes of the cradles limit the diameter of the tubing which can be suitably pierced by the Bickmore, et al. '532 device.

U.S. Pat. No. 5,398,718 to Michael J. Roinick, Sr. discloses a pair of tap line pliers with a platform mechanism adapted for holding a line on one side and a tapping mechanism on the other side. The tapping mechanism is adapted to tap a refrigerant line and has a valve mechanism for draining the tapped line. However, the tapping mechanism of the Roinick, Sr. '718 device is located within a semicircular guide which would limit the diameter of the hose which could be pierced by the device. In addition, the inclusion of a valve mechanism in the Roinick, Sr. '718 device complicates the device and could lead to an increased cost to the consumer. Lastly, the Roinick, Sr. '718 device fails to provide a means for holding the connector fittings necessary for a drip irrigation system.

Likewise, U.S. Pat. No. Des. 235,844 to Loren A. Matthews discloses the ornamental design of a punch tool that features a C-shaped head on a pair of crossed handles. The upper jaw of the C-shaped head features a brace and the lower jaw features a puncturing element. However, the Matthews '844 patent fails to provide a method for holding a hose steady while punching a hole in it, which could lead to a misplaced hole or a tear in the hose if it were to slip during the penetration process. Furthermore, as a hose was inserted between the upper and lower jaws of the Matthews '844 device it would be exposed to possible tears and unwanted puncture by the puncturing element. Additionally, the Matthews '844 device would limit the diamater of the hose to be penetrated to the width of the device between the upper and lower jaws. Finally, the Matthews '844 device fails to provide a holder for the connector fittings to be placed in the hose.

Lastly, U.S. Pat. No. 3,939,563 to Robert F. Deike discloses a vise and punch tool that consists of a pair of adjustable locking pliers with opposed semi-cylindrical gripping sleeves extending from the handles. A tubular housing extends laterally from one of the sleeves and holes a piercing element adapted to be struck by a hammer to pierce a work piece embraced by the sleeves. However, since the Deike '563 device is intended for use on road sign posts, the gripping sleeves are set for pieces of that diameter and would not be suitable for holding landscape hoses having a smaller diameter. In addition, the piercing element of the Deike '563 must be struck to accomplish the piercing process, requiring the user to use both hands and and to carry additional tools. Finally, the Deike '563 device does not provide a means for carrying or inserting the connector fittings to be inserted in the hose.

While the above-described devices fulfill their respective, particular objectives and requirements, the aforementioned patents do not describe a drip system tool that allows the user to easily puncture an irrigation hose and consistently form holes with the correct diameter for placement of connector fittings. The Diggs '958, Bickmore, et al. '532, Roinick, Sr. '718, Matthews '844 and Deike '563 devices limit the diameter of hoses to be punctured to predefined cradles into which the hose must fit. Moreover since the Deike '563 device is intended for use on road sign posts, the gripping sleeves are set for cylinders of that diameter and would not be suitable for holding landscape hoses having a smaller diameter. Furthermore, the Myers '201 and Matthews '844 devices could tear or otherwise damage a hose during the piercing process since they fail to provide a method for holding the hose steady during the process. In addition, as a hose was inserted between the upper and lower jaws of the Matthews '844 device it would be exposed to possible tears and unwanted puncture by the puncturing element. The Bickmore, et al. '532, Roinick, Sr. '718, Matthews '844, and Deike '563 patents fail to provide a means for carrying the connector fittings to be inserted in the hose. Futhermore, the Diggs '958, Bickmore, et al. '532 and Deike '563 devices could be tedious to use. The Diggs '958 patent requires the user to continually slide the connector element onto the pliers and remove the device once it is inserted into the hose, which could be time consuming and awkward for many individuals. The cradle component of the Bickmore, et al. '532 device requires the user to maneuver and reset it each time a different sized hose is used, and the piercing element of the Deike '563 must be struck to accomplish the piercing process, requiring the user to use both hands and and to carry additional tools. Additionally, the inclusion of a valve mechanism in the Roinick, Sr. '718 device complicates the device and could lead to an increased cost to the consumer. Finally, use of the drip emitter as the piercing element of the Diggs '958 device could lead to damage or breakage of the drip emitter, requiring repair or replacement of the part.

Therefore, a need exists for a new and improved drip system tool that can be used for puncturing an irrigation hose for the insertion of a connector fitting. In this regard, the present invention substantially fulfills this need. In this respect, the drip system tool according to the present invention substantially departs from the convention nal concepts and designs of the prior art, and in doing so provides an apparatus primarily developed for the purpose of allowing the user to easily puncture an irrigation hose and consistently form holes with the correct diameter for placement of connector fittings.

SUMMARY OF THE INVENTION

In view of the foregoing disadvantages inherent in the known types of piercing tools now present in the prior art, the present invention provides an improved drip system tool, and overcomes the above-mentioned disadvantages and drawbacks of the prior art. As such, the general purpose of the present invention, which will be described subsequently in greater detail, is to provide a new and improved drip system tool which has all the advantages of the prior art mentioned heretofore and many novel features that result in a drip system tool which is not anticipated, rendered obvious, suggested, or even implied by the prior art, either alone or in any combination thereof.

To attain this, the present invention essentially comprises a piercing member having a handle on one end and a piercing pin on the opposite end and cross fastened to a retention member having a handle on one end and a retention hook on the opposite end. An axially oriented extension formed with a cylindrical socket is also located on the same end of the retention member which features the retention hook.

There has thus been outlined, rather broadly, the more important features of the invention in order that the detailed description thereof that follows may be better understood and in order that the present contribution to the art may be better appreciated.

The invention may also include a gripping surface for the handle ends of the piercing and retention members. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved drip system tool that has all of the advantages of the prior art piercing tools and none of the disadvantages.

It is another object of the present invention to provide a new and improved drip system tool that may be, easily and efficiently manufactured and marketed.

An even further object of the present invention is to provide a new and improved drip system tool that has a low cost of manufacture with regard to both materials and labor, and which accordingly is then susceptible of low prices of sale to the consuming public, thereby making such a drip system tool economically available to the buying public.

Still another object of the present invention is to provide a new drip system tool that provides in the apparatuses and methods of the prior art some of the advantages thereof, while simultaneously overcoming some of the disadvantages normally associated therewith.

Even still another object of the present invention is to provide a drip system tool for forming consistently sized holes in irrigation type hoses. This allows the user to easily and quickly prepare an irrigation hose for a drip irrigation system.

Yet another object of the present invention is to provide a drip system tool that retains the irrigation hose in a stable position while holes are placed in the hose. This allows the user to avoid tearing or damaging the hose while penetrating the hose.

Even yet another object of the present invention is to provide a drip system tool with a socket for holding conventional connector fittings for a drip irrigation system. This allows the user to quickly and easily place the connector fitting into the previously formed hole, eliminating the need for the user to manipulate the connector fitting into the hole.

Lastly, it is an object of the present invention to provide a new and improved drip system tool that has gripping surfaces on the handles. This provides the user a greater amount of stability when rising the tool and decreases the chances that the tool will slip from the user's hands.

These together with other objects of the invention; along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description mal-es reference to the annexed drawings wherein.

The same reference numerals refer to the same parts throughout the various figures.

DESCRIPTION OF THE PREFERRED EMBODIMENT

Figure 1:
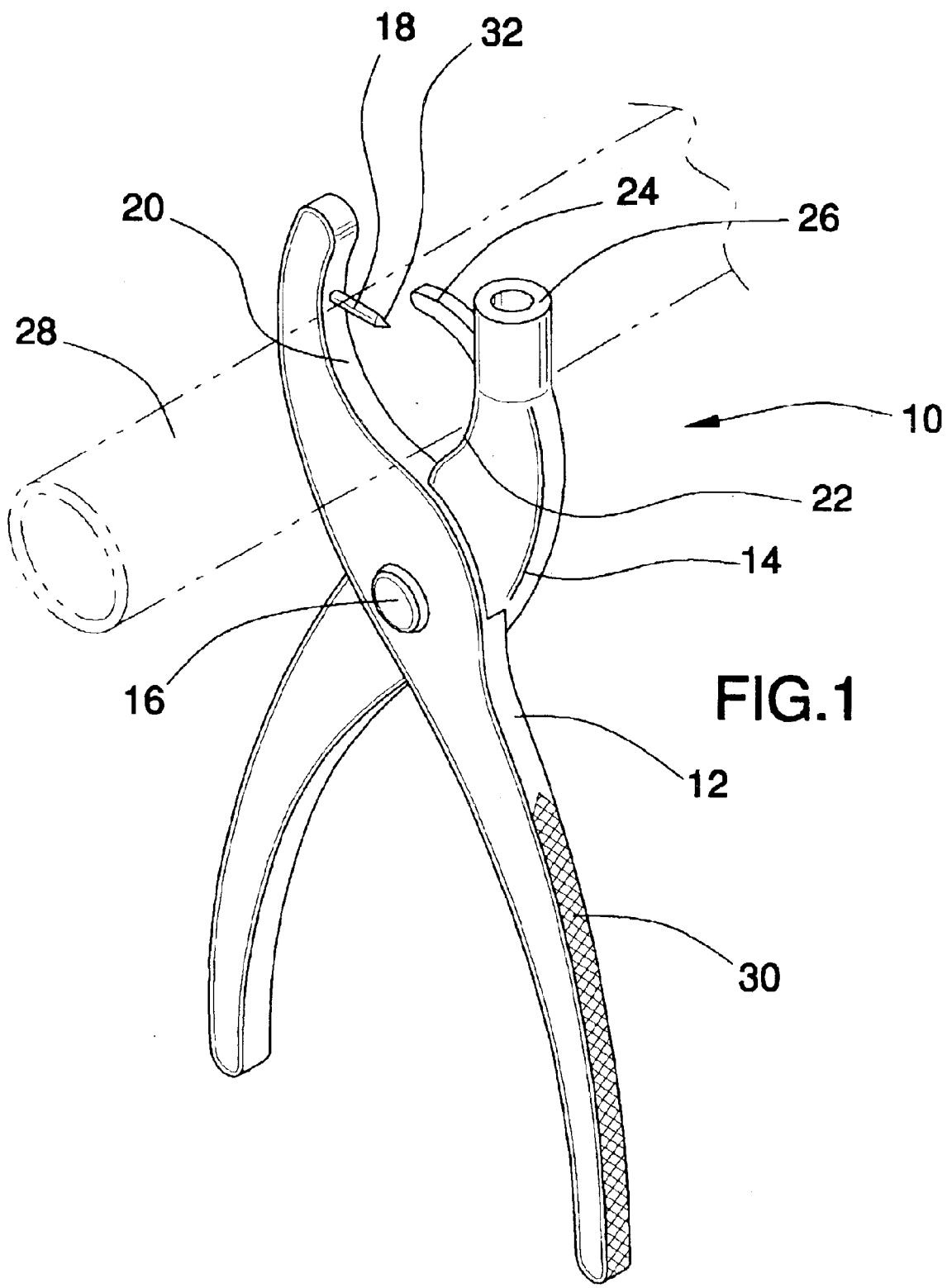
FIG. 1 is a right side perspective view of the preferred embodiment of the drip system tool constructed in accordance with the principles of the present invention and showing the piercing process.

Referring now to the drawings, and particularly to FIGS. 1–4, a preferred embodiment of the drip system tool of the present invention is shown and generally designated by the reference numeral 10.

Figure 3:
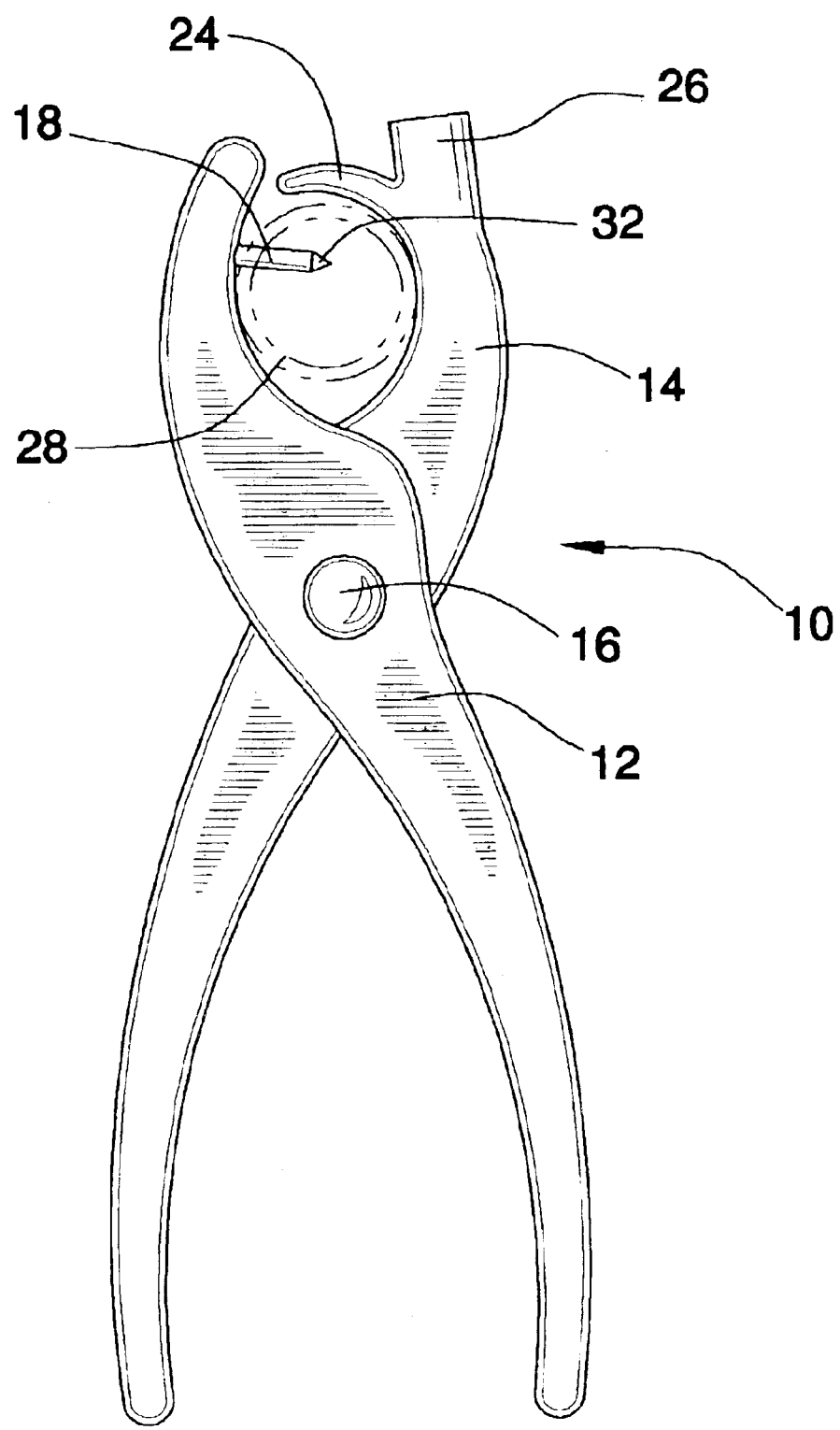
FIG. 3 is a front view of the drip system tool of the present invention in a closed position.

In FIG. 1, a new and improved drip system tool 10 of the present invention for easily and consistently piercing an irrigation hose for placement of connector fittings is illustrated and will be described. More particularly, the drip system tool 10 has a piercing handle 12 and a bracing handle 14 that are crossed in the center and joined by a fastener 16. The upper end of the piercing handle 12 features a perforating pin 18 on its inner edge 20. The inner edge 22 of the opposing bracing handle 14 features an inwardly extending tube retention hook 24. The upper end of the bracing handle 14 features a connector installation unit 26 formed in the top of the bracing handle 14 and into which connector fittings to be inserted into the irrigation hose 28 are placed. The handles, 12 and 14, are formed with a gripping surface 30 on the lower ends and would measure approximately 6–7 inches in length. The perforating pin 18 would be 0.375 inches long with a diameter of 0.140 inches and a tapered tip 32. The tube retention hook 24 would be arched to help securely hold the cylindrical hose 28 during the piercing process and would have a 0.375 inch radius arc that could not reach the opposing inner edge 20 when the tool 10 is in the closed position, as can be seen in FIG. 3. The connector installation unit 26 is an axially oriented extension, the tip of which would incorporate a 0.204 inch diameter by 0.380 inch deep socket and is further addressed in FIG. 4.

Figure 2:
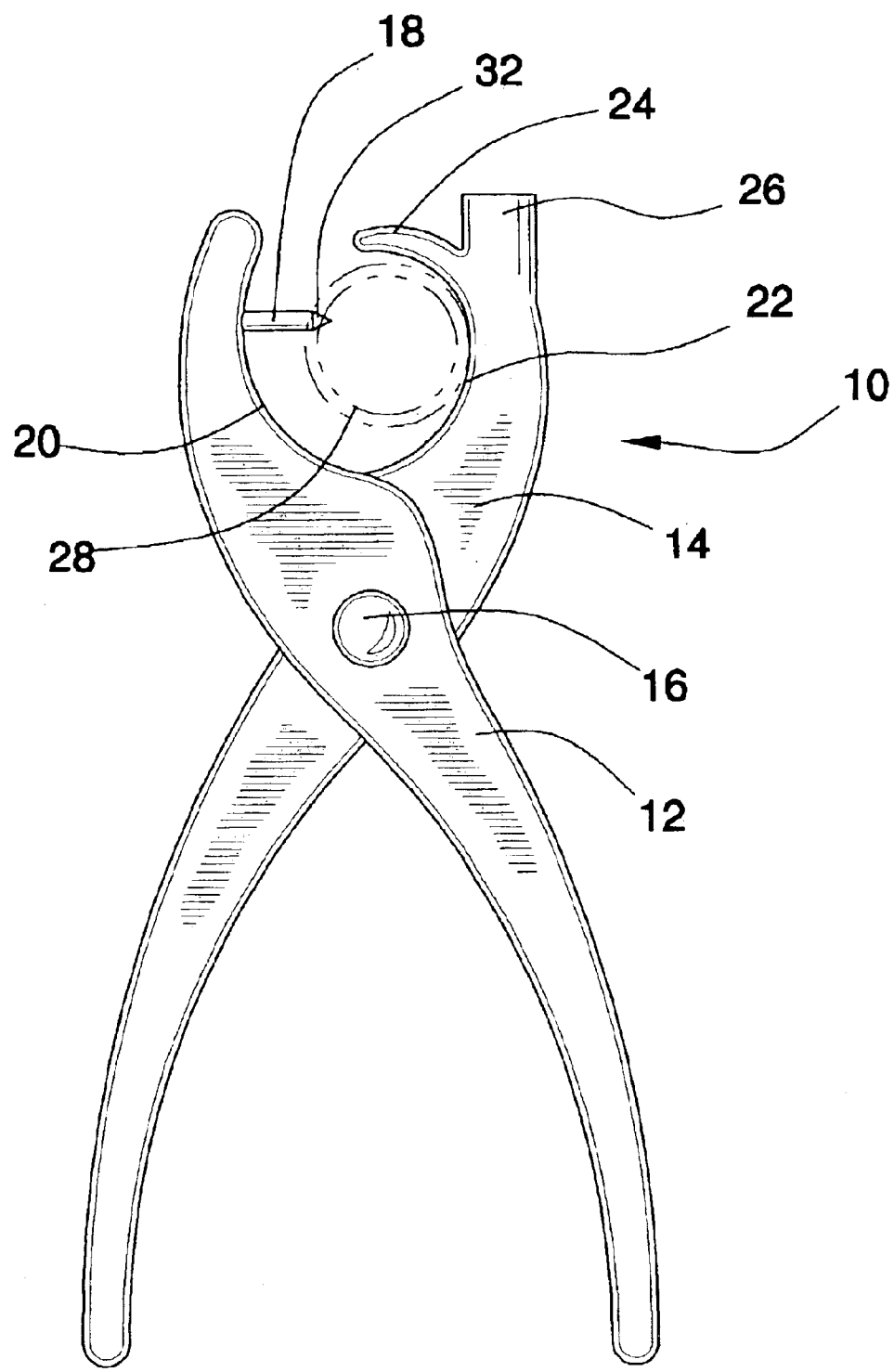
FIG. 2 is a front view of the drip system tool of the present invention in an open position.

FIGS. 2 and 3 show the drip system tool 10 in first a partially open and then a closed position, respectively, wherein the opposing handles, 12 and 14, would be moved apart from one another for the insertion or removal of the irrigation hose 28. The hose 28 would be placed against the inner edge 22 of the bracing handle 14 and within the arc of the tube retention hook 26 before the handles, 12 and 14, were squeezed together to bring the perforating pin 18 into contact with the hose 28. As the handles, 12 and 14, are brought closer together, the perforating pin 18 would penetrate the hose 28 and form a hole identical in diameter to a conventional connector fitting 34 (see FIG. 4) for drip irrigation systems. Note that the tip 32 of the perforating pin 18 penetrates only one side of the irrigation hose 28.

Figure 4:
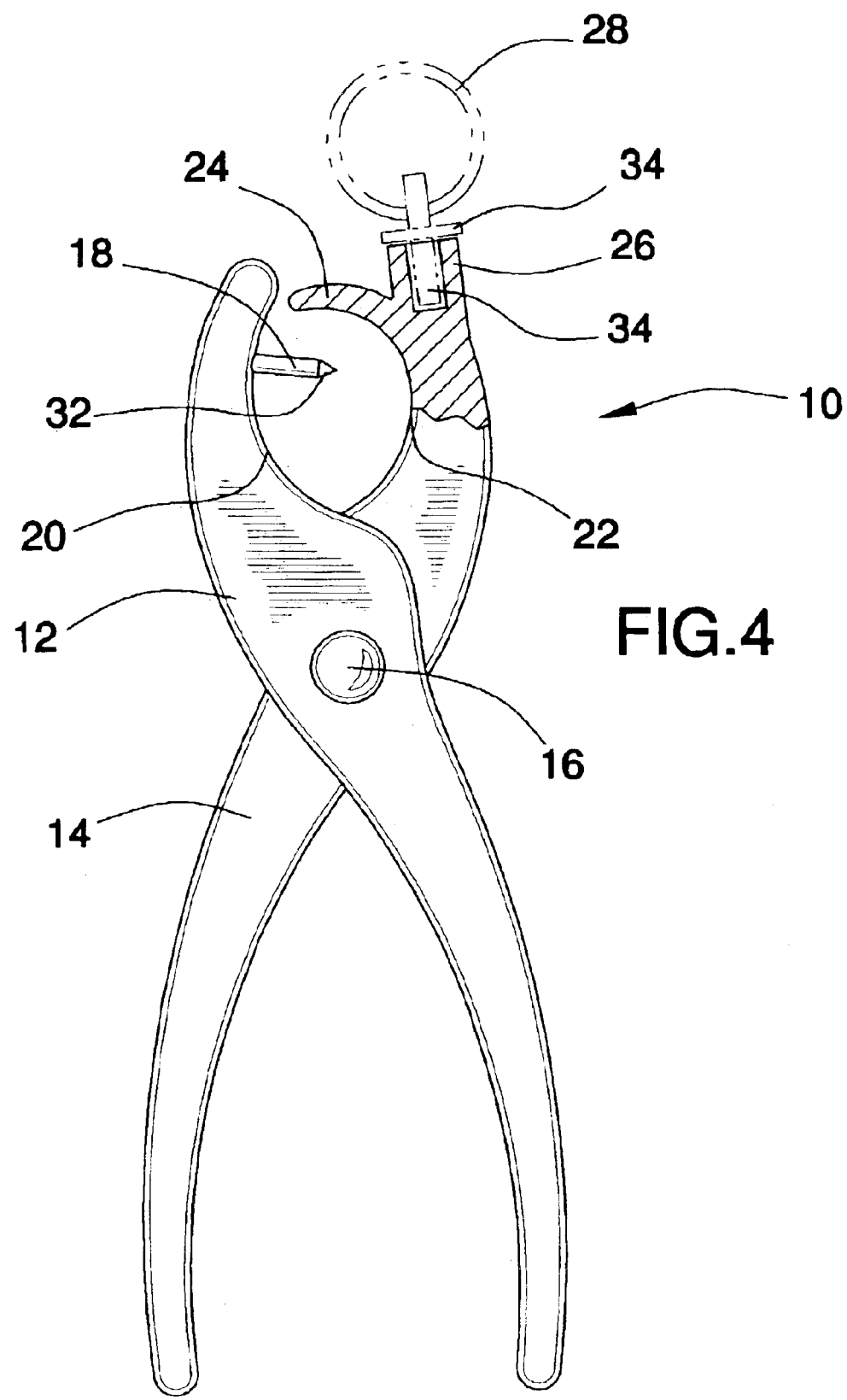
FIG. 4 is a front view of the drip system tool of the present invention with a cutaway sectional view of the connector installation unit.

FIG. 4 is a front view of the drip system tool 10 with a cutaway sectional view of the connector installation unit 26. The nipple 36 of a connector fitting 34 is inserted into the connector installation unit 26, the hole is formed in the irrigation hose 28, the hose 28 is lifted above the connector installation unit 26, and the connector fitting 34 is inserted into the hole.

In use, the user would place a piece of irrigation hose 28 between the jaws of the drip system tool 10 and a connector fitting 34 would then be seated in the connector installation unit 26. The hose 28 would be placed within the arc of the tube retention hook 26 to secure the hose 28 against movement. The handles, 12 and 14, are then squeezed together, allowing the perforating pin 18 to penetrate the hose 28 and form an insertion hole. The drip system tool 10 could then be used to push the connector fitting 34 into the previously formed hole.

While a preferred embodiment of the drip system tool has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a variety of wood may be used for the handles of the drip system tool. Also, the handles could be scored or covered with a rubber or leather layer to provide a gripping surface on the handles. And although easily and consistently piercing irrigation hoses for placement of connector fittings has been described, it should be appreciated that the drip system tool herein described is also suitable for piercing various types of cylindrical conduits for the formation of consistently sized holes.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A drip system tool comprising:

a first elongated piercing member having a handle end, a central portion, and jaw end with an inner edge;

a second tool member having a handle end, a central portion, and a jaw end with an inner edge and an axially oriented extension formed with a cylindrical socket and connected at said central portion to said central portion of said first piercing member wherein said first piercing member crosses said second tool member and said inner edge of said jaw end of said first piercing member faces said inner edge of said jaw end of said second tool member;

a piercing pin perpendicularly connected from said inner edge of said jaw end of said first piercing member; and a retention hook extending from said inner edge of said jaw end of said second tool member wherein said retention hook extends toward said inner edge of said jaw end of said first piercing member and is located above said piercing pin.

2. The drip system tool of claim 1 wherein said socket has a diameter compatible with receiving a conventional cylindrical connector fitting for a drip irrigation system.

3. A drip system tool comprising:

an elongated piercing member having a handle end, a central portion, and piercing end with an inner edge;

a fastener rotatably connected to said central portion of said piercing member;

an elongated retention member having a handle end, a central portion, and a retainer end with an inner edge and connected at said central portion to said fastener wherein said central portion of said piercing member crosses said central portion of said retention member and said inner edge of said piercing end of said piercing member faces said inner edge of said retainer end of said retention member and wherein said inner edges of said piercing and said retention ends are advanced towards each other when said handle ends of said piercing and said retention members are squeezed together;

an axially oriented extension formed with a cylindrical socket and connected to said retention end of said retention member;

a piercing pin having a first end and a second, tapered end culminating in a sharp point and perpendicularly connected on said first end to said inner edge of said piercing end of said piercing member;

a retention hook extending from said inner edge of said retainer end of said retention member wherein said retention hook extends toward said inner edge of said piercing end of said piercing member and is located above said piercing pin.

4. The drip system tool of claim 3 wherein said socket has a diameter compatible with receiving a conventional cylindrical connector fitting for a drip irrigation system.

5. The drip system tool of claim 3 wherein said piercing end of said piercing member is arcuate.

6. The drip system tool of claim 3 wherein said piercing pin is advanced toward said inner edge of said retainer end of said retention member when said handle ends of said piercing and said retention members are squeezed together.

7. The drip system tool of claim 6 wherein the length of said piercing pin is limited and does not allow said tapered end of said piercing pin to reach said inner edge of said retention end of said retainer member when said handle ends of said piercing and said retention members are squeezed together.

8. The drip system tool of claim 3 wherein said retention hook is arced to accept a cylindrical tube between said retention hook and the intersection of said piercing and said retention members.

9. The drip system tool of claim 8 wherein said retention hook is advanced toward said inner edge of said piercing end of said piercing member when said handle ends of said piercing and said retention members are squeezed together.

10. The drip system tool of claim 3 wherein said handle ends of said piercing and said retention members have a gripping surface.

* * * * *